United States Patent [19]
Geoffray

[11] 3,731,606
[45] May 8, 1973

[54] PROCESS AND APPARATUS FOR THE TAKING OF PHOTOGRAPHS IN RELIEF

[76] Inventor: Marcel Geoffray, 10 rue Lenotre, Rillieux, France

[22] Filed: Apr. 27, 1971

[21] Appl. No.: 137,865

[30] Foreign Application Priority Data
Apr. 29, 1970 France..................................7015597

[52] U.S. Cl...........................95/18 P, 95/36, 352/43, 352/58, 352/60, 352/86, 352/87, 350/130, 350/132, 350/167
[51] Int. Cl...............................................G03b 35/08
[58] Field of Search........................95/18, 18 P, 36, 95/37; 352/57–65, 67, 85, 86, 87, 94; 353/10, 7; 350/130, 131, 133, 144, 167

[56] References Cited

UNITED STATES PATENTS

| 2,045,093 | 6/1936 | Newcomer | 95/18 P |
| 2,045,119 | 6/1936 | Carpenter | 95/18 P |
| 3,268,238 | 8/1966 | Finkel | 40/106.51 X |
| 3,520,588 | 7/1970 | Salyer et al. | 352/86 X |

FOREIGN PATENTS OR APPLICATIONS

| 360,977 | 11/1931 | Great Britain | 95/18 |

Primary Examiner—John M. Horan
Assistant Examiner—Richard M. Sheer
Attorney—Irving M. Weiner

[57] ABSTRACT

Method and apparatus for taking photographs in relief. Light from the object being photographed is first passed through an opaque diaphragm having a plurality of pairs of spaced slots therein, then a lens disposed behind the diaphragm, next a movable shutter having two spaced apart slots therein separated a distance equal to the separation of a pair of slots in the diaphragm disposed behind the lens, and finally a lenticulated screen disposed behind the shutter whereby an image of the object is focused in relief on a selected segment of a film.

5 Claims, 14 Drawing Figures

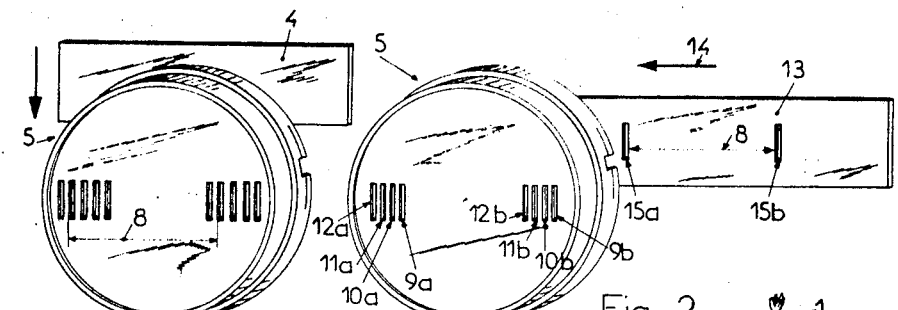
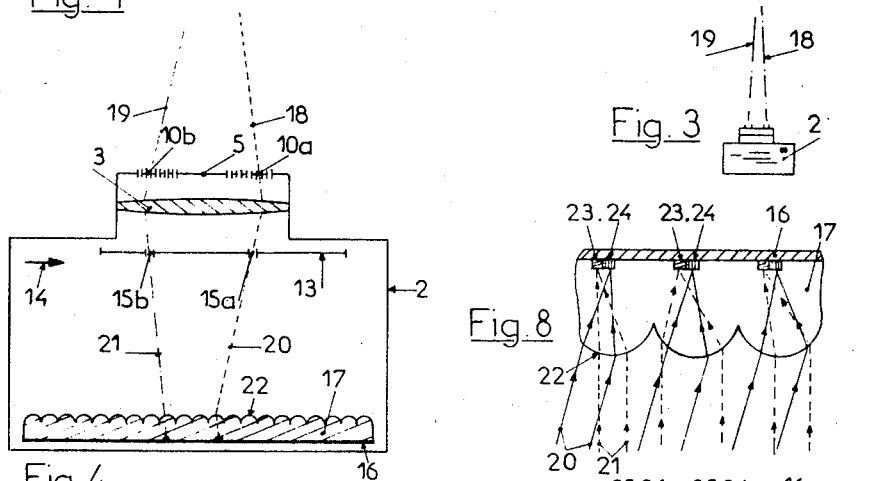
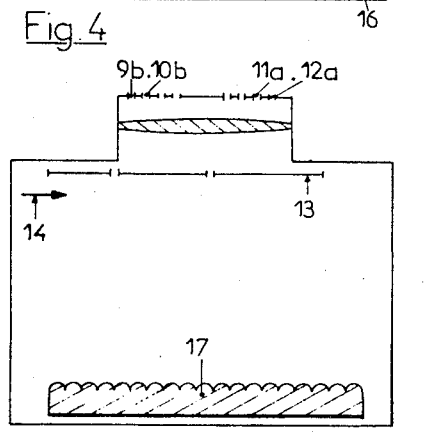
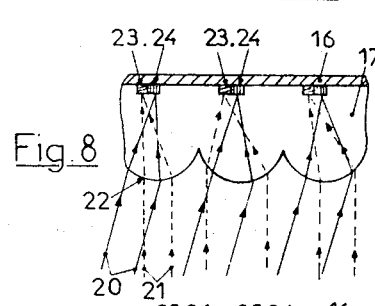
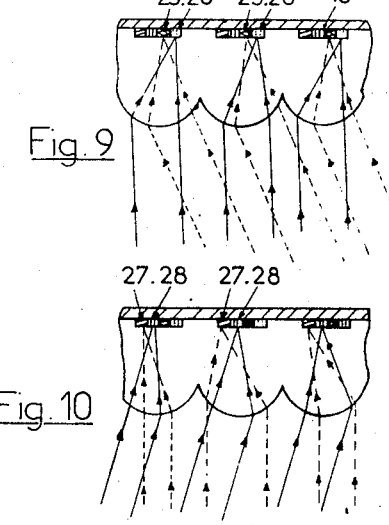

PATENTED MAY 8 1973 3,731,606

PROCESS AND APPARATUS FOR THE TAKING OF PHOTOGRAPHS IN RELIEF

BACKGROUND OF THE INVENTION

The present invention relates to a new method for the taking of photographic views or images capable of giving the viewer an impression of relief.

Photographs are known which are formed by the juxtaposition of segments to which there is applied a transparent, lenticulated screen capable of giving an impression of relief when observed with the naked eye.

Nevertheless, the various known methods used for the taking of these views are long and complicated and therefore it is only possible to photograph certain subjects in relief. In fact, it is most frequently necessary to place a photographic apparatus or a camera on a circular rail which enables it to move in successive stages around the object to be photographed. It is obvious that this is impossible for photographing a subject situated at a great distance, for example a landscape. In addition, the time necessary for the slot is very long. This, together with the necessity of providing a cumbersome installation supporting the rail, makes it practically impossible to photograph anything other than models or near and stationary subjects. For example, it is not possible with known methods to photograph in relief, and in a lifelike manner, any desired subject by means of a snapshot, as is the case in an ordinary photograph.

Finally, photographs in relief obtained by the known methods depict a subject which most frequently has a fixed appearance.

SUMMARY OF THE INVENTION

An object of the present invention is to remedy these disadvantages by using a new method which makes it possible to photograph in relief by a single shot, any subject whatever, moving or stationary.

The method according to the invention consists in reproducing on a flat support, a series of segments located behind a transparent, lenticulated screen, and it is characterized in that the shot is taken through a diaphragm comprising several pairs of aligned slots, the two slots of the same pair being separated by a distance similar to the space between a pair of human eyes, whilst masking is obtained by means of a shutter which displaces relative to the slots in the diaphragm, such that groups of two segments which form an image pair on the impressioned film behind the screen, correspond to the view observed by the two eyes of the user, the subject being thus photographed at the same time from various angles.

If the shutter comprises two slots and displaces "longitudinally" i.e. along the row of slots, the subject is moreover photographed at different moments for each image pair.

If, on the contrary, the shutter displaces "transversely" relative to the row of slots, it masks the latter simultaneously and an actual snap-shot is obtained, which can be taken, for example, with a flash unit.

In any case, the shot takes place with a single movement from a fixed point.

Nevertheless, when the observer looks at the photograph obtained in this way, he has a perfect impression of relief. If he moves the photograph slightly, he sees the subjects of the different planes shifting relative to each other, which gives the impression observed in reality when, from a fixed point, one turns ones head whilst looking at a given object.

Finally, since this method makes it possible to capture a subject in lifelike manner, even if it is a moving subject, the different image pairs forming the photograph may correspond to the various attitudes of the subject photographed (case of a shutter displacing "longitudinally") such that the photograph offers both an impression of life and relief on the photograph.

BRIEF DESCRIPTION OF THE DRAWINGS

The accompanying drawing, given as a non-limiting example, makes it easier to understand the features of the invention.

FIG. 1 is a perspective view of a fixed diaphragm according to the invention, with which there is associated a shutter which displaces transversely.

FIG. 2 shows the same diaphragm with which there is associated a shutter which displaces longitudinally.

FIG. 3 shows the arrangement of the photographic device relative to the subject photographed.

FIG. 4 is a diagrammatic sectional view of a photographic device, illustrating the principle of taking pictures according to the invention with the diaphragm of FIG. 2.

FIGS. 5, 6 and 7 are similar views illustrating the method of taking photographs with the diaphragm of FIG. 2.

FIGS. 8, 9 and 10 are views illustrating diagrammatically the path of light rays through the lenticulated screen, for various image pairs of segments of the impressioned film.

DESCRIPTION OF THE PREFERRED EMBODIMENTS

Figure 6:
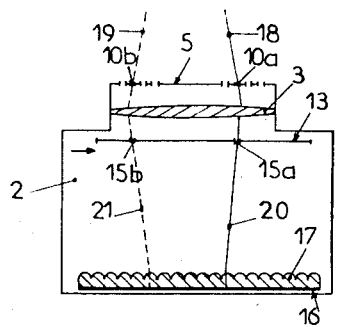

There is shown in FIG. 3, a subject 1 which it is proposed to be photographed in relief by means of a photographic device 2 by taking a single snap-shot from a fixed point relative to the subject 1.

One of the features of the invention consists of placing in front of, or behind the lens 3 of the photographic apparatus 2, a diaphragm such as 5. This diaphragm is constituted by an opaque wall in which there are cut slots, the number of which varies with the effect desired and the lens used. For example, there can be four, eight or even twelve pairs of slots.

The diaphragm 5 of FIGS. 1 to 7 comprises four pairs of slots 9a – 9b – 10a – 10b, 11a – 11b and 12a – 12b.

In the case of FIG. 1, the shutter 4 moves transversely relative to the row of slots 9a, 9b, 10a, 10b etc., i.e. it masks all these slots simultaneously. The shot is actually instantaneous and may be taken with a flash unit, in order to give a photograph in which the subject appears stationary.

On the other hand, in the case of FIGS. 2 and 4–7 masking is accomplished by a shutter 13 which is moved longitudinally, i.e., in the direction of arrow 14, to the row of slots 9a, 9b, 10a etc . . . This shutter 13 comprises only two slots 15a and 15b.

The separation 8 of the slots 15a and 15b is equal to the separation of the two slots of the same pair of slots in the diaphragm 5 (for example 10a and 10b.).

In order to take the photograph, there is placed in the apparatus 2 an impressionable film 16 located behind a transparent lenticulated screen 17 of a type known per se.

It can be seen in FIGS. 4 and 8 that if one uncovers two slots (for example 10a and 10b) of the same pair on the diaphragm 5, these slots receive two light rays 18 and 19 differently inclined, coming from the subject 1. Behind the lens 3, the light beams 20 and 21 each strike a different lenticular surface of the filter 17 at different angles of incidence. Focussing on the sensitive layer of the film 6 thus takes place behind each lenticular surface 22 on two distinct segments for example 23 and 24. These two segments 23 and 24 form an image pair which then gives the impression of relief to an observer who looks at the photograph 16 through the filter 17.

Figure 7:
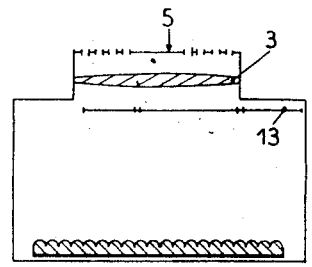

In the example illustrated in FIGS. 5 to 7 it can be seen that during its displacement, the longitudinal shutter 13 begins by masking all the slots. Then, (FIG. 6) it uncovers in succession the various pairs of slots, i.e. at a given moment only the two slots (for example 10a and 10b) of one pair are simultaneously uncovered. This makes it possible to make an impression of the film 16 with the light beams 20 and 21, the incidence of which on the grooves of the filters 17 varies from one pair of slots to the next (for example 9a and 9b or even 12a and 12b).

At the end of the stroke (FIG. 7) the shutter 13 masks all the slots of the diaphragm 5.

Finally, when one looks at the photograph thus obtained the impression of relief which it provides varies according to the orientation given to the film 16 relative to the observer. When this orientation is modified refer to FIGS. 8, 9 and 10 the image pair perceived by the observer is varied, for example, they are received from segments 23 and 24 in the orientation illustrated in FIG. 8, then from segments 25 and 26 in the orientation illustrated in FIG. 9, and then from segments 27 and 28 in the orientation illustrated in FIG. 10.

Figure 11:
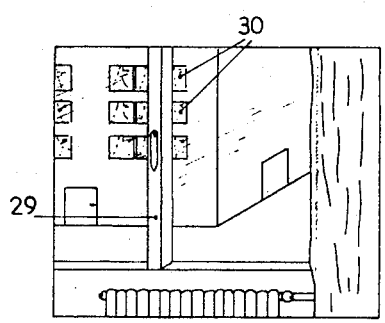
FIGS. 11 and 12 illustrate the impression received when one looks at a photograph in relief according to the invention, whilst moving it slightly, the subject photographed being stationary.
Figure 12:
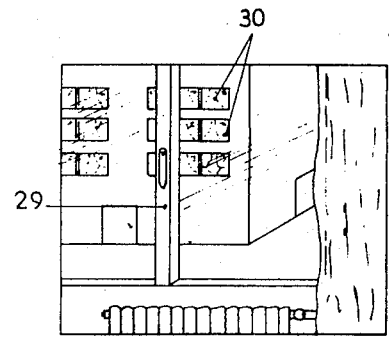

Thus, if a stationary subject has been photographed comprising, for example, objects in a first plane such as the upright of the window 29 (FIGS. 11 and 12) and objects in a second plane such as the windows 30 of a building, the viewer will see the windows of the rear plane moving behind the upright 29 if he moves the photograph in front of his eyes. This reinforces the impression of relief.

Figure 13:
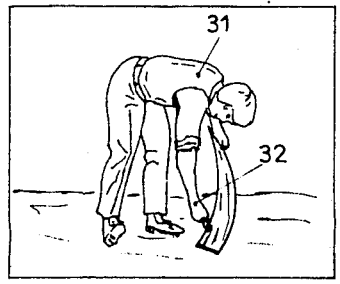
FIGS. 13 and 14 show the impression received in the same manner when a photograph in relief according to the invention, obtained by photographing a moving subject, is moved.
Figure 14:
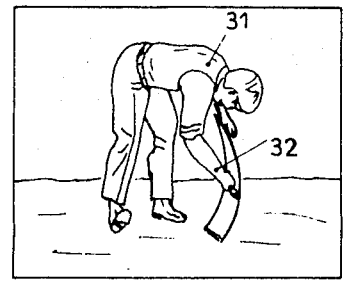

Naturally, if the subject 31 is moving (FIGS. 13 and 14) when it is photographed from a fixed point (FIG. 3) the viewer will see the subject 31 moving (for example, noticing the movement of the arm 32) when he moves the photograph in front of his eyes. Thus, not only will the subject give an impression of relief, but more so it will not have the rigid appearance of hitherto known photographs.

What is claimed is:

1. A method of taking photographs in relief comprising:
    passing a light beam through means defining at least one pair of spaced apart slots in a diaphragm;
    subsequently, passing said light beam through a lens;
    selectively passing said light beam through means defining a pair of spaced apart slots in a movable shutter;
    passing said light beam from said means defining a pair of spaced apart slots in said shutter through a selected one of a plurality of lenticular surfaces which comprise a lenticulated screen; and
    focusing said light beam on a selected segment of a sensitive layer of film.

2. An apparatus for taking photographs in relief comprising:
    an opaque diaphragm having means defining a plurality of pairs of spaced apart slots;
    a lens disposed in a spaced apart juxtaposition to said diaphragm;
    a movable shutter having means defining two spaced apart slots, said shutter being disposed in a spaced apart juxtaposition to said lens;
    a lenticulated screen disposed in a spaced apart juxtaposition to said shutter; and
    a sensitive layer of film disposed in abutting juxtaposition to said lenticulated screen.

3. An apparatus for taking photographs as defined in claim 2, wherein:
    said means defining said two spaced apart slots in said movable shutter are separated a distance equal to the separation between means defining a pair of said means defining a plurality of pairs of said spaced apart slots in said diaphragm; and
    said movable shutter is movable in a longitudinal direction relative to said means defining said plurality of pairs of spaced apart slots in said diaphragm.

4. An apparatus for taking photographs as defined in claim 3, wherein:
    said movable shutter is also movable in a direction transverse relative to said means defining said plurality of pairs of spaced apart slots in said diaphragm.

5. An apparatus for taking photographs as defined in claim 3, wherein the distance separating a pair of said means defining a plurality of pairs of spaced apart slots in said diaphragm is similar to the space between a pair of human eyes.

* * * * *